US010728309B2

(12) United States Patent
Moriyama et al.

(10) Patent No.: US 10,728,309 B2
(45) Date of Patent: Jul. 28, 2020

(54) INFORMATION MANAGEMENT SYSTEM AND INFORMATION PROVIDING METHOD

(71) Applicant: PFU LIMITED, Kahoku-shi, Ishikawa (JP)

(72) Inventors: Takuya Moriyama, Ishikawa (JP); Masahito Sakui, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 202 days.

(21) Appl. No.: 15/295,273

(22) Filed: Oct. 17, 2016

(65) Prior Publication Data

US 2018/0034897 A1 Feb. 1, 2018

(30) Foreign Application Priority Data

Jul. 27, 2016 (JP) .................................. 2016-147037

(51) Int. Cl.
*G06F 15/173* (2006.01)
*H04L 29/08* (2006.01)
(Continued)

(52) U.S. Cl.
CPC .............. *H04L 67/10* (2013.01); *G06F 3/121* (2013.01); *G06F 3/1229* (2013.01);
(Continued)

(58) Field of Classification Search
None
See application file for complete search history.

(56) References Cited

U.S. PATENT DOCUMENTS

2008/0301811 A1* 12/2008 Jung .................... G06F 17/3089
726/23
2010/0205300 A1* 8/2010 Uchida ............... G06F 21/6218
709/224
(Continued)

FOREIGN PATENT DOCUMENTS

JP 2002-358377 A 12/2002
JP 2004-030625 A 1/2004
(Continued)

OTHER PUBLICATIONS

Japanese Notice of Reason for Refusal issued in corresponding Japanese Patent Application No. 2016-147037, dated Jun. 9, 2019, with English Translation.

*Primary Examiner* — Brian Whipple
*Assistant Examiner* — Anthony T Rotolo
(74) *Attorney, Agent, or Firm* — McDermott Will & Emery LLP

(57) ABSTRACT

There is provided an information management system having: a management server device and a client terminal, wherein the management server device includes: a processor programmed to: store information to be managed; and determine whether or not to transmit at least some of the stored information to an outside of the information management system, and wherein the client terminal includes: a processor programmed to: determine whether or not to transfer the information stored by the management server device; and transmit at least some of the stored information to the outside of the information management system based on a result determined by the management server device and a result determined by the client terminal.

9 Claims, 11 Drawing Sheets

(51) Int. Cl.
*G06F 3/12* (2006.01)
*H04L 29/06* (2006.01)

(52) U.S. Cl.
CPC ........ *G06F 3/1285* (2013.01); *H04L 63/0281* (2013.01); *H04L 67/02* (2013.01); *H04L 67/14* (2013.01); *H04L 67/22* (2013.01); *H04L 67/42* (2013.01)

(56) References Cited

U.S. PATENT DOCUMENTS

| | | | | |
|---|---|---|---|---|
| 2012/0110327 | A1* | 5/2012 | Doerner | H04L 9/0825 |
| | | | | 713/165 |
| 2012/0317277 | A1 | 12/2012 | Hirahara | |
| 2013/0305218 | A1* | 11/2013 | Hirsch | G06F 8/30 |
| | | | | 717/106 |
| 2014/0181916 | A1* | 6/2014 | Koo | H04W 12/08 |
| | | | | 726/4 |
| 2015/0100412 | A1* | 4/2015 | Sterns | G06Q 30/0251 |
| | | | | 705/14.41 |
| 2018/0019889 | A1* | 1/2018 | Burns | H04L 12/2807 |

FOREIGN PATENT DOCUMENTS

| | | |
|---|---|---|
| JP | 2004-318333 A | 11/2004 |
| JP | 2008-134951 A | 6/2008 |
| JP | 2012-124758 A | 6/2012 |
| JP | 2012-255946 A | 12/2012 |

\* cited by examiner

Management server 2

Client terminal 3

Sequence diagram (S10)

Transfer processing by the client terminal 3 (S20)

Management server processing (S30)

Browser management screen 500

Transmission permission screen 550

Need determining processing by management server (S40)

INFORMATION MANAGEMENT SYSTEM AND INFORMATION PROVIDING METHOD

CROSS-REFERENCE TO RELATED APPLICATIONS

This application is based on and claims priority under 35 USC 119 from Japanese Patent Application No. 2016-147037 filed Jul. 27, 2016.

FIELD

The present invention relates to an information management system and an information providing method.

BACKGROUND

For example, Japanese Patent Application Laid-Open (JP-A) No. 2002-358377 discloses an image forming device which is equipped with a storage 216, which stores a name list of held functions, and a controller 213, which detects the functions being used, checks the detected functions against the name list of the held functions, generates information for the utilization of the held functions, and transmits the generated information to a terminal 12 via a communication unit 215.

Further, Japanese Patent Application Laid-Open (JP-A) No. 2004-318333 discloses a proxy server 121, which receives the acquisition request information of connection equipment information from the external equipment (terminal equipment) 104, and authenticates the external equipment 104, connects through a fire wall 103 to a database management server 111 provided in the intra network 101 for managing connection equipment information on the basis of the authentication result, and transmits the received acquisition request information to the database management server 111, and receives the connection equipment information corresponding to the transmitted acquisition request information among the pieces of connection equipment information managed by the database management server 111 from the data base management server 111, and transmits the received connection equipment information to the external equipment 104.

Further, Japanese Patent Application Laid-Open (JP-A) No. 2004-030625 discloses the mediation device 101, which sets the network environment information by writing it in a flash ROM, acquires management object information such as the secret information required for performing communication with the management device 102 via the Internet 112 from an image forming apparatus 100 via a LAN, reads the network environment information and the management object information in the flash ROM after setting the management object information by writing it in the flash ROM and transmits them to the management device 102 via a public line 103, when network environment information as the secret information required for performing communication with the management device 102 via the Internet 112 is inputted from an input section.

Further, Japanese Patent Application Laid-Open (JP-A) No. 2012-255946 discloses a monitoring device which monitors a plurality of image forming devices being able to communicate therewith and transmits monitoring information collected by the monitoring to a central management device centrally managing information of the plurality of image forming devices. The monitoring device comprises: collection means for collecting the monitoring information from the plurality of image forming devices; storage means for storing the monitoring information collected by the collection means; transmission means for transmitting the monitoring information stored in the storage means to the central management device; selection means for receiving selection of a data type to be stored in a local network in the collected monitoring information; and output means for outputting data acquired according to the data type selected by the selection means as output data to store it in the local network form monitoring information transmitted by the transmission means.

SUMMARY OF THE INVENTION

According to an aspect of the invention, there is provided an information management system having: a management server device and a client terminal, wherein the management server device includes: a processor programmed to: store information to be managed; and determine whether or not to transmit at least some of the stored information to an outside of the information management system, and wherein the client terminal includes: a processor programmed to: determine whether or not to transfer the information stored by the management server device; and transmit at least some of the stored information to the outside of the information management system based on a result determined by the management server device and a result determined by the client terminal.

According to an aspect of the invention, there is provided an information management system having: a management server device in which a range capable of communicating is set within a predetermined range of a network; and a client terminal connected to the network within the predetermined range, wherein a processor of the management server device is programmed to store information to be managed, wherein a processor of the client terminal is programmed to: run software for access to the management server device; and transmit some of the information stored by the management server device to an outside of the predetermined range if the software is activated.

According to another aspect of the invention, there is provided a network management method in an information management system including a management server device and a client terminal, the method comprising: determining, by the management server device, whether or not to transmit at least some of stored information to an outside of the information management system; determining, by the client terminal, whether or not to transfer the information stored by the management server device; and transmitting, by the client terminal, at least some of the information stored by the management server device to the outside of the information management system based on a result determined by the client terminal and a result determined by the management server device.

BRIEF DESCRIPTION OF THE DRAWINGS

Exemplary embodiments of the present invention will be described in detail based on the following figures.

DESCRIPTION OF EMBODIMENTS

The following will describe an embodiment of the present invention with reference to the drawings.

Figure 1:
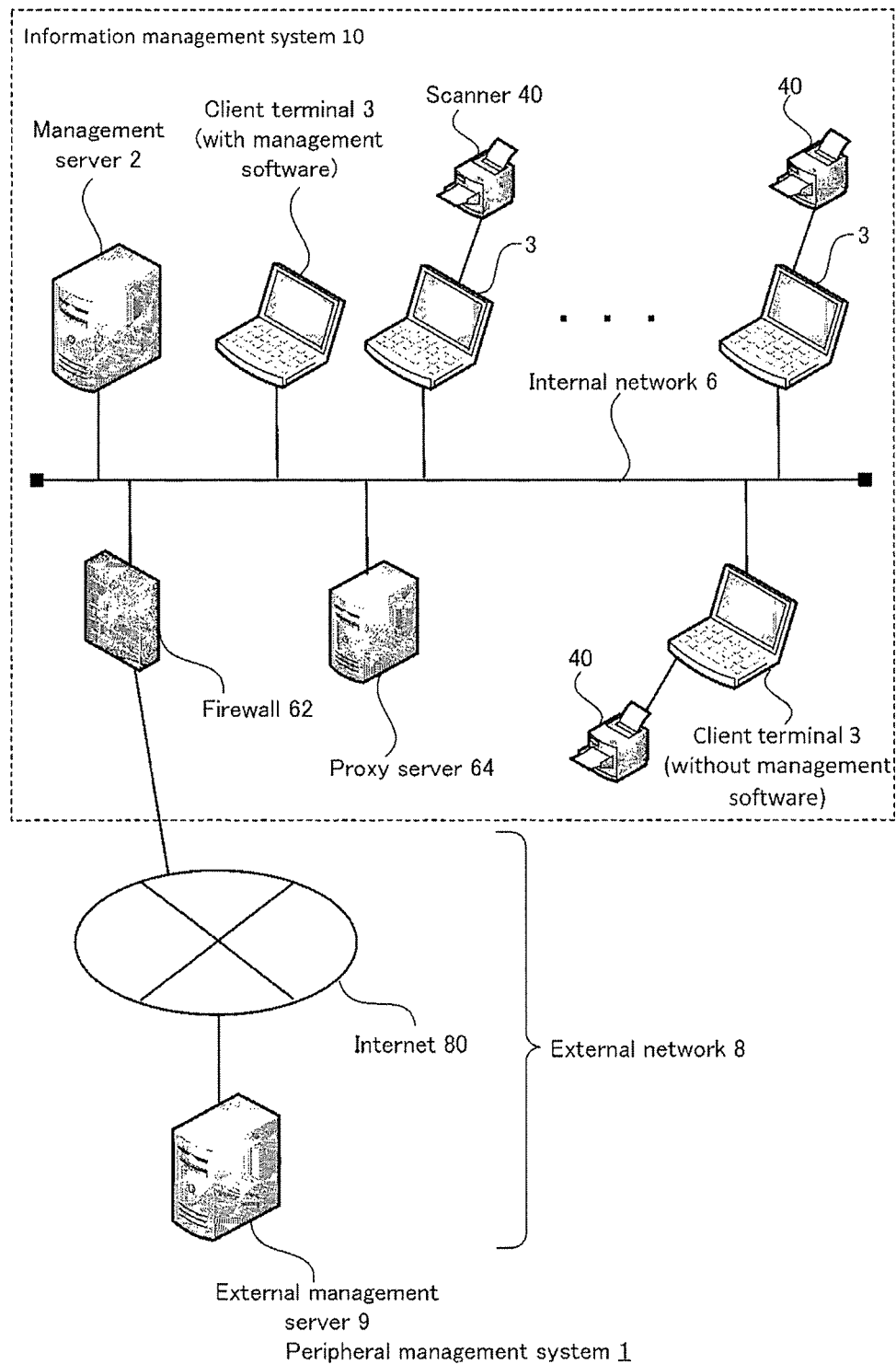
FIG. 1 is an explanatory diagram of an overall configuration of a peripheral management system 1.

FIG. 1 is an explanatory diagram of an overall configuration of a peripheral management system 1.

As shown in FIG. 1 as an example, the peripheral management system 1 includes an information management system 10 connected to an internal network 6, and an external network 8 which is on an outside of the information management system 10.

The information management system 10 includes a management server 2, a plurality of client terminal 3, and at least one scanner 40. The information management system 10 is separated from the external network 8 by a firewall 62. The client terminal 3 of the information management system 10 communicates with a terminal on the external network 8 by using a proxy server 64. In this exemplary embodiment, the management server 2 cannot communicate with the terminal on the external network 8 because settings about the proxy server 64 is not set in the management server 2. Accordingly, it is possible to maintain the security of the management server 2. The management server 2 is one example of a management server device in which a range capable of communicating is set within a predetermined range of a network. The external management server 9 on the external network 8 is one example of the management server on the outside of the predetermined range.

The management server 2 is a computer terminal which collects and stores information to be managed. In this exemplary embodiment, the management server 2 collects information about a peripheral device (specially, scanner 40) and permits the client terminal 3 to display the collected information about the peripheral device.

The client terminal 3 is a computer connected to the internal network 6. In this exemplary embodiment, the client terminal 3 is a computer terminal operated by a user of the peripheral device (scanner) or an administrator. Browser management software (to be described later) to manage the peripheral devices is installed in the client terminal 3 of the administrator. It is possible to access to the information stored in the management server 2 via the browser management software. In this exemplary embodiment, there is also a client terminal 3 in which the browser management software is not installed.

The scanner 40 is one example of the peripheral device and is a management target to be managed by the management server 2. The scanner 40 is, for example, connected to the client terminal 3 via a USB cable. The scanner 40 may be a network scanner connected directly to the internal network 6. The management target is not limited to the scanner but, for example, may be a printer, a multifunction printer, a kiosk terminal, a machine tool and a vehicle which have communication functions, a smart phone, or a mobile terminal.

The firewall 62 is installed at the boundary between the internal network 6 and the external network 8 and protects the security of the internal network 6.

The proxy server 64 is a relay server which accesses from the internal network 6 to the Internet 80 on behalf of the terminals on the internal network 6. The proxy server 64 is, for example, installed in the DMZ (Demilitarized Zone) which is at the boundary between the internal network 6 and the external network 8.

In this example, the fire wall 62 is not mandatory. For example, the proxy server 64 may be installed at the boundary between the internal network and the external network.

The external management server 9 is an external management server installed on the external network 8. In this exemplary embodiment, the external management server 9 is a transfer destination of the information to be managed by the management server 2. For example, the external management server 9, on the basis of the information transferred from the management server 2, suggests and supports about the peripheral device.

By using the components described above, the information to be managed by the management server 2 (for example, operating state of the peripheral device) is transferred to the external management server 9 by the client terminal 3 in which the browser management software is installed. The external management server 9 supports and suggests on the basis of the operating state of the peripheral device and the like.

Figure 2:
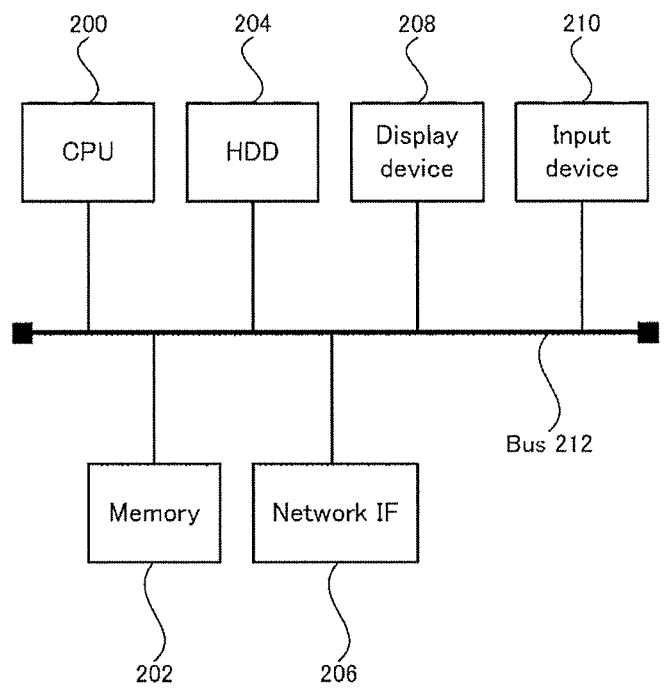
FIG. 2 is an explanatory diagram of a hardware configuration of a management server 2.

FIG. 2 is an explanatory diagram of a hardware configuration of the management server 2.

As shown in FIG. 2, the management server 2 has a CPU 200, a memory 202, an HDD 204, a network interface 206 (network IF 206), a display device 208, and an input device 210, which are interconnected via a bus 212.

The CPU 200 is, for example a central processing unit.

The memory 202 is, for example, a volatile memory and functions as a main storage device.

Figure 4:
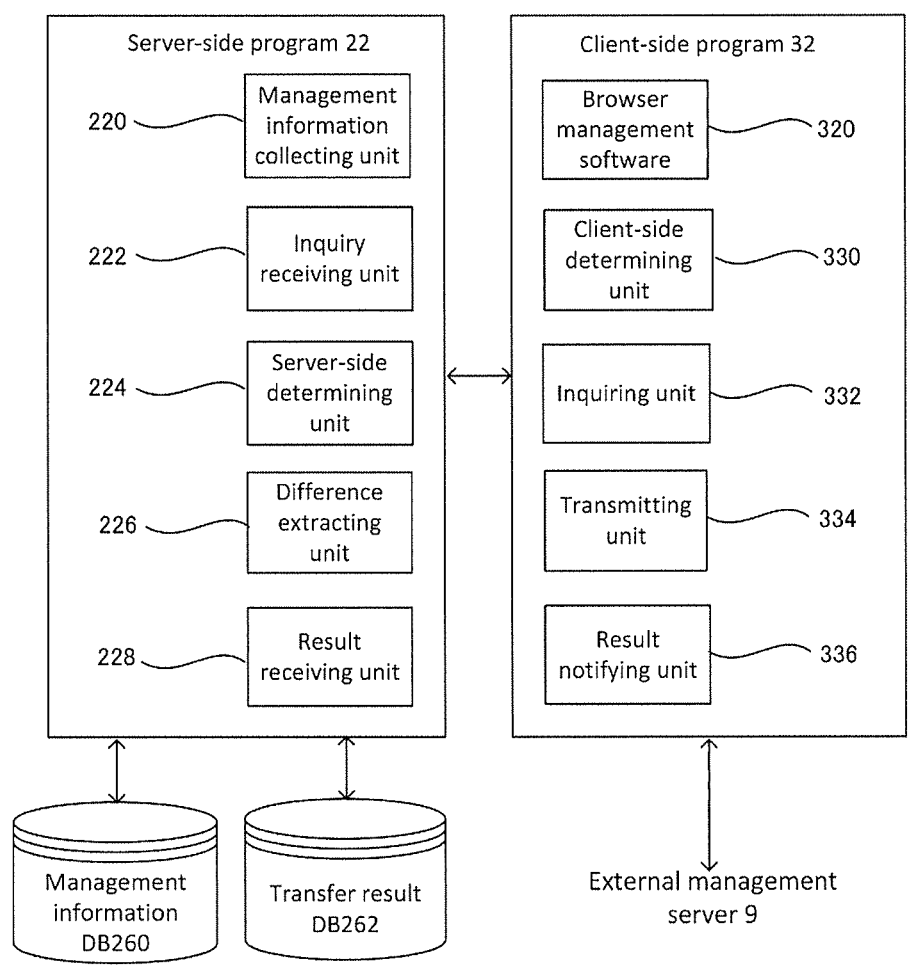
FIG. 4 is an explanatory diagram of a functional configuration of the management server 2 and the client terminal 3.

The HDD 204 is, for example, a hard disk drive and functions as a nonvolatile storage device configured to store a computer program (for example, server-side program 22 in FIG. 4) and other data files (for example, management information database 260 and transfer result database 262 in FIG. 4).

The network IF 206 is an interface for wired or wireless communication. For example, the network IF 206 enables communication on the internal network 6.

The display device 208 is, for example, a liquid crystal display.

The input device 210 is, for example, a keyboard and a mouse.

Figure 3:
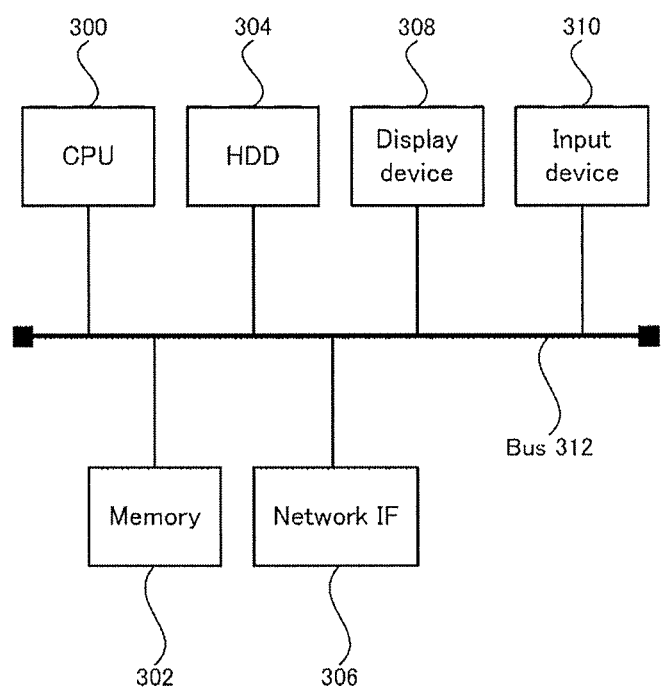
FIG. 3 is an explanatory diagram of a hardware configuration of a client terminal 3.

FIG. 3 is an explanatory diagram of a hardware configuration of the client terminal 3.

As shown in FIG. 3, the client terminal 3 has a CPU 300, a memory 302, an HDD 304, a network interface 306 (network IF 306), a display device 308, and an input device 310, which are interconnected via a bus 312.

The CPU 300 is, for example, a central processing unit.

The memory 302 is, for example, a volatile memory and functions as a main storage device.

The HDD 304 is, for example, a hard disk drive and functions as a nonvolatile storage device configured to store a computer program (for example, client-side program 32 in FIG. 4) and other data files.

The network IF 306 is an interface for wired or wireless communication. For example, the network IF 306 enables communication on the internal network 6.

The display device 308 is, for example, a liquid crystal display.

The input device 310 is, for example, a keyboard and mouse.

FIG. 4 is an explanatory diagram of a functional configuration of the management server 2 and the client terminal 3;

As shown in FIG. 4, the management server 2 of the present example has a server-side program 22 installed in it and includes a management information database 260 (management information DB260) and a transfer result database 262 (transfer result DB262). The management information DB260 is one example of a storage unit according to the present invention.

Further, the client terminal 3 (for an administrator) of the present example has a client-side program 32 installed in it.

The server-side program 22 has a management information collecting unit 220, an inquiry receiving unit 222, a server-side determining unit 224, a difference extracting unit 226, and a result receiving unit 228.

The server-side program 22 may be implemented partially or wholly by hardware such as an ASIC.

The client-side program 32 has browser management software 320, a client-side determining unit 330, an inquiring unit 332, a transmitting unit 334, and a result notifying unit 336.

In the server-side program 22, the management information collecting unit 220 collects the information to be managed. For example, the management information collecting unit 220 collects automatically the information about the peripheral device installed on the internal network 6. The collected information is, for example, information about an operating environment of the peripheral device, a product version number of the peripheral device, the number of peripheral devices, a state of the peripheral device, or the client terminal connected to the peripheral device. In this exemplary embodiment, the management information collecting unit 220 collects, in cooperation with an agent program installed in the client terminal 3, information about a scanner 40 used in the client terminal 3 connected to the internal network 6 and stores the collected information in the management information DB260. The management information collecting unit 220 is one example of a collecting unit according to the present invention.

The inquiry receiving unit 222 receives from the client terminal 3 an inquiry about whether or not information transfer is performed.

The server-side determining unit 224 determines whether or not to transmit at least some of the information stored in the management information DB260 to an outside of the information management system 10. For example, the server-side determining unit 224 determines whether or not the information transfer is performed based on a period from when the information is previously transferred. In this exemplary embodiment, when the inquiry receiving unit 222 receives the inquiry from the client terminal 3, the server-side determining unit 224 identifies the date and time when the previous information transfer is successfully completed based on transfer result information registered in the transfer result DB262. After identifying, the server-side determining unit 224 determines whether or not the information transfer is performed, based on whether or not the predetermined period from the identified previous date and time passes.

The difference extracting unit 226 extracts a difference between the information stored in the management information DB260 and the information transferred previously. The difference extracting unit 226 determines the extracted difference information is information to be transferred this time.

The result receiving unit 228 receives the result of the proxy transmission from the client terminal 3, and stores the received result in the transfer result DB262. Here the proxy transmission by the client terminal 3 has the same meaning as the information transfer. In this exemplary embodiment, when the result receiving unit 228 receives from the client terminal 3 success or failure of the proxy transmission which is requested of the client terminal 3, the result receiving unit 228 stores the success or failure of the proxy transmission, identification information of the client terminal 3, and the date and time in the transfer result DB262.

In the client-side program 32, the browser management software 320 is browser software for access to the information stored in the management server 2. For example, the browser management software 320 is browser software to operate and browse an HTML file, and dedicated application software which displays the information stored in the management server 2 and can perform setting changes of the peripheral device to be managed. The browser management software 320 may be an outside of the client-side program 32. The browser management software is one example of the software or the browser software according to the invention.

The client-side determining unit 330 determines whether or not to transfer the information to be managed stored in the management server 2. For example, the client-side determining unit 330 determines whether or not to perform information transfer on the condition that the browser management software 320 is activated on the client terminal 3. By using the condition that the browser software which is the dedicated application is activated, it is possible to reflect the intention of the administrator.

In this exemplary embodiment, the client-side determining unit 330 permits the information transfer if a predetermined operation by a user is detected on a management screen (to be described later) which the browser management software 320 displays.

The inquiring unit 332 inquires of the management server 2 whether the information transfer is performed or not.

The transmission unit 334 transmits at least some of the information stored in the management information DB260 to the external network 8 based on a result determined by the client-side determining unit 330 and a result determined by the server-side determining unit 224. For example, the transmission unit 334 transmits to the external management server 9 the information to be managed which is extracted by the difference extracting unit 226, only when the client-side determining unit 330 determines it is possible to perform the information transfer (permission) and the server-side determining unit 224 determines it is possible to perform the information transfer (permission). Accordingly, by the double check scheme, it is possible to provide information to an outside while a security level of a server is maintained.

The transmission unit 334, for example, gets the proxy settings set by the user who logs in the client terminal 3 of the administrator, and transmits the information to the external destination via the proxy server 64.

The result notifying unit 336 notifies the management server 2 of whether or not the external management server 9 receives successfully the information transmitted by the transmitting unit 334. That is to say, the result notifying unit 336 notifies the management server 2 of whether the proxy transmission (information transfer) requested by the management server 2 is successful or not.

The management information DB260, for example, stores the information about the operating environment of the peripheral device, the product version number of the peripheral device, the number of peripheral devices, the state of the peripheral device, or the client terminal connected to the peripheral device.

In this exemplary embodiment, the management information DB260 stores the model name of the scanner, the scanner ID, the operating state of the scanner, the operation log of the scanner, and the version number of the driver or firmware of the scanner.

The transfer result DB262 stores the success or failure of the information transfer, the identification information of the client terminal 3 of which the information transfer is requested, and the date and time when the information transfer is performed.

Figure 5:
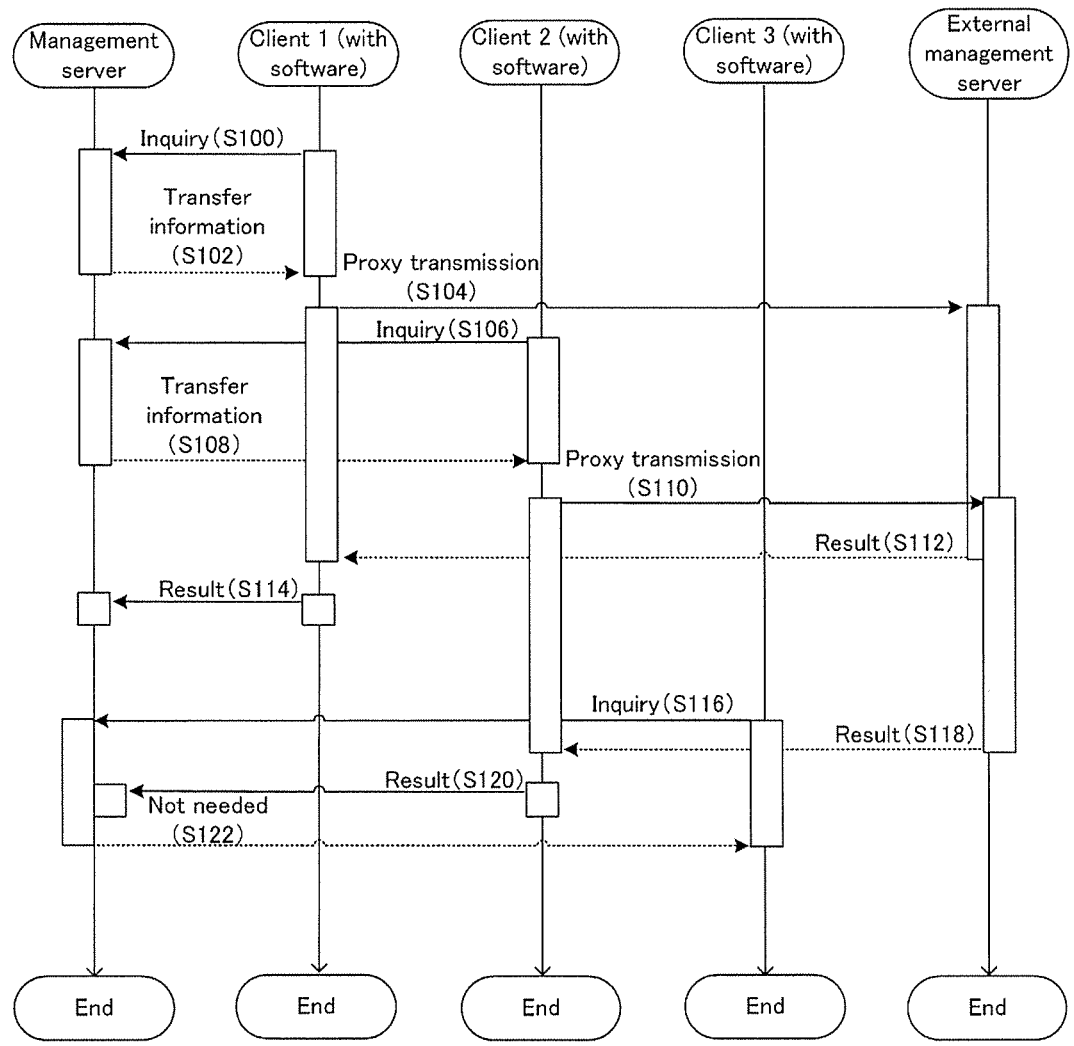
FIG. 5 is a sequence diagram of information transfer (S10) in the peripheral management system 1.

FIG. 5 is a sequence diagram of information transfer (S10) in the peripheral management system 1. In this exemplary embodiment, the client-side program 32 (including browser management software 320) is installed in three client terminals 3 (client 1 to 3), and a case is given as a specific example in which there are inquiries from these client terminals 3 at different timings. In the explanation of the figure, each of the three client terminals 3 is expressed as "client 1 to 3", and management server 2 is expressed as "management server", and the external management server 9 is expressed as "external management server".

As shown in FIG. 5, in step 100 (S100), the client 1 inquires of the management server whether the information transfer is performed or not.

In Step 102 (S102), the management server makes information to be transferred (difference information) in response to an inquiry from the client 1, and transmits to the client 1.

Between step 100 and step 102, various processing is performed. For example, the client 1 and the management server 2 determine whether the information transfer is performed or not. The detail operation will be described later.

In step 104 (S104), the client 1 transmits to the external management server, on behalf of the management server, the transfer information received from the management server.

In step 112 (S112), when the external management server successfully receives the transfer information transmitted on behalf of the management server by the client 1, the external management server notifies the client 1 of the success in receiving.

Between the above step 104 and step 112, the inquiry from the client 2 which is other than the client 1 is carried out.

Namely, in step 106 (S106), the client 2 inquires of the management server whether the information transfer is performed or not.

In step 108 (S108), the management server makes information to be transferred (difference information) in response to the inquiry from the client 2, and transmits to the client 2.

As described above, the management server requests the information transfer of each of the client terminals which inquires, until the information transfer is successfully completed by any of the client terminals. In this case, the transfer information requested by the client terminals is same.

In step 110 (S110), the client 2 transmits to the external management server, on behalf of the management server, the transfer information received from the management server.

In step 118 (S118), when the external management server receives successfully the transfer information transmitted on behalf of the management server by the client 2, the external management server notifies the client 2 of the success in receiving.

In step 114 (S114), when the client 1 receives the success in receiving from the external management server, the client 1 notifies the management server of the success of the information transfer.

In step 116 (S116), the client 3 inquires of the management server whether the information transfer is performed or not.

In step 122 (S122), the management server notifies, in response to the inquiry from the client 3, that the information transfer is not needed. Namely, after any of the client terminals notify the management server of the success of the information transfer, the management server prohibits the information transfer for a predetermined period.

Even if the external management server receives the same information from the client terminals (client 1 and 2), the external management server stores each of the information once, and notifies the client terminals of the success in receiving. Specially, in step 118 (S118), the external management server also notifies the client 2 of the success in receiving. Then, in step 120 (S120), the client 2 notifies the management server of the success of the information transfer.

As described above, the management server 2 requests the same information transfer of the plurality of client terminals 3. After any of the client terminal 3 succeed in the information transfer and the management server 2 receives the success, the information transfer is prohibited for a predetermined period. Thus, it is possible to succeed certainly in the information transfer and the unnecessary information transfer processing is suppressed.

Figure 6:
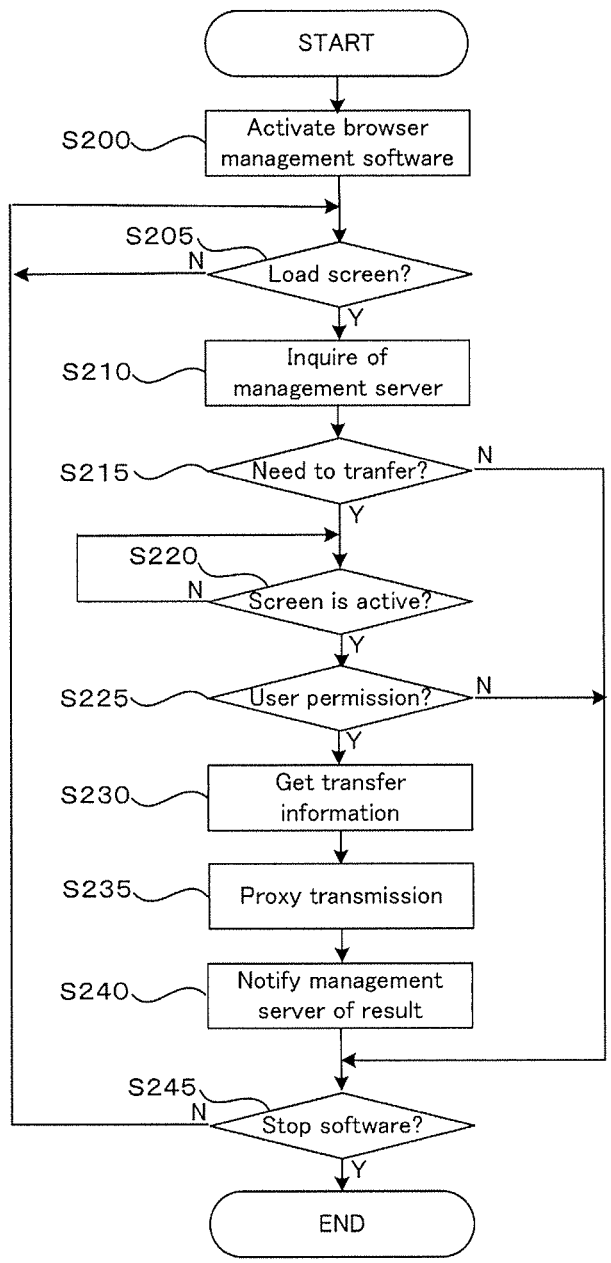
FIG. 6 is an explanatory flowchart of transfer processing (S20) by the client terminal 3.

FIG. 6 is an explanatory flowchart of transfer processing (S20) by the client terminal As shown in FIG. 6, in step 200 (S200), the client terminal 3 activate the browser management software 320 in response to the instruction operation to activate the software by a user.

Figure 8:
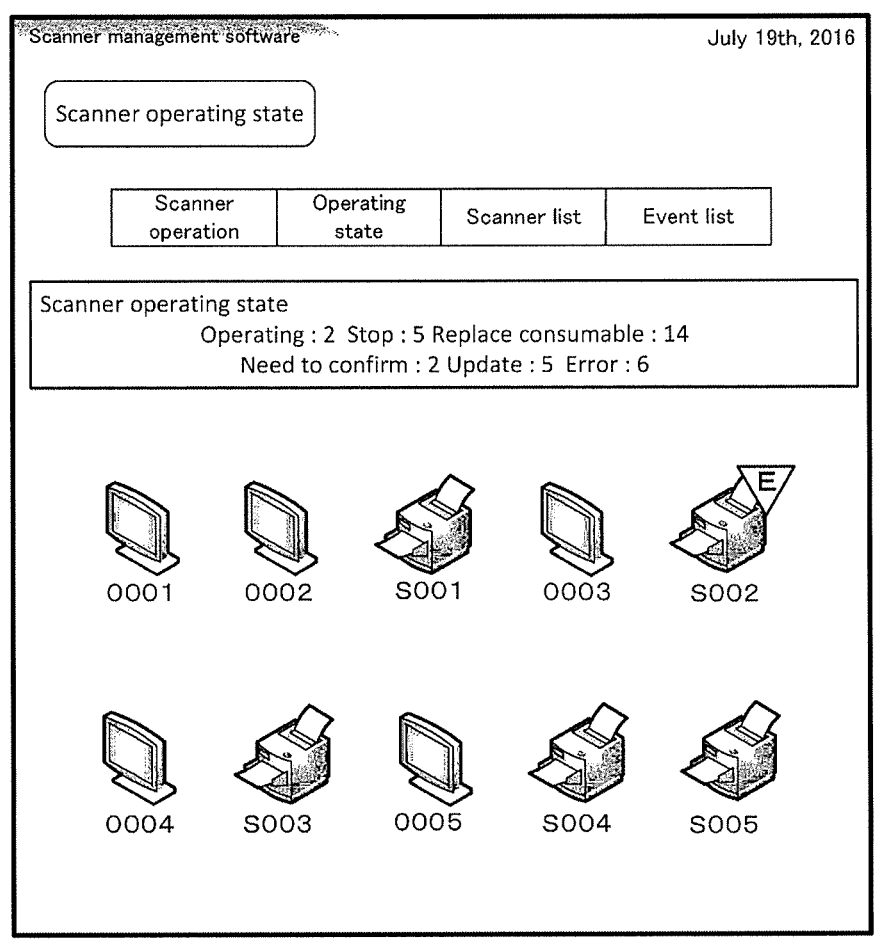
FIG. 8 is an explanatory view of a browser management screen 500 to be displayed by browser management software 320.

When the browser management software 320 is activated, the browser management software 320 accesses the management server 2 and gets the information to be managed and displays the browser management screen 500 illustrated in the FIG. 8 on the display device 308 of the client terminal 3. On the browser management screen 500, for example, the operating state of a scanner is displayed.

In step 205 (S205), the inquiring unit 332 determines whether or not the browser management screen 500 is loaded by the browser management software 320.

If the browser management screen 500 is loaded by the browser management software 320, shifts to processing in S210, and otherwise, waits until the next loading. The browser management screen 500 is loaded, in the case where the browser management software 320 is activated at the start, in the case where the reload operation of the browser management screen 500 is performed by a user, in the case where the screen transition is performed on the browser management screen 500, or in the case where the predetermined time when the browser management screen 500 keeps active passes.

In step 210 (S210), the inquiring unit 332 inquires of the management server 2 whether the information transfer is performed or not.

In step 215 (S215), if the information transfer is permitted by the management server 2, the inquiring unit 332 shifts to processing in S220 and, if the information transfer is prohibited by the management server 2, the inquiring unit 332 shifts to processing in S245.

In step 220 (S220), the client-side determining unit 330 determines whether or not the browser management screen 500 is active. If the browser management screen 500 is active, the client-side determining unit 330 shifts to processing in S225. If the browser management screen 500 is not active, the client-side determining unit 330 waits until the browser management screen 500 gets active.

Figure 9:
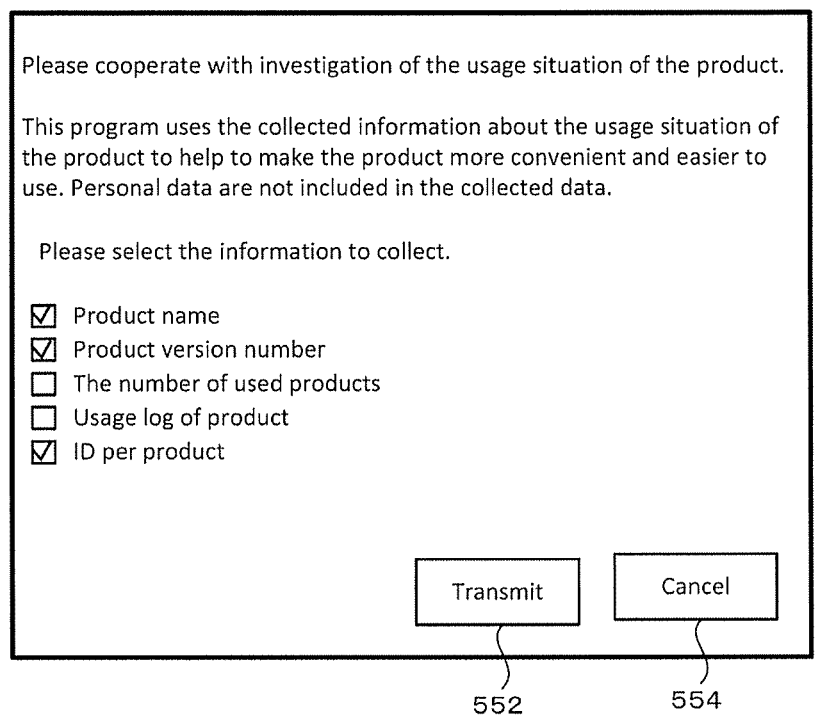
FIG. 9 is an explanatory view of a transmission permission screen 550 which pops up.

In step 225 (S225), the client-side determining unit 330 pops up the transmission permission screen 550 illustrated in FIG. 9 and waits for the input operation of a user. The transmission permission screen 550 has a transmission button 552 which receives a selection operation of transmission permission, a cancel button 554 which receives a selection operation of transmission canceling, and selection boxes to select the type of information to be transmitted. Accordingly, the administrator can transfer the necessary and sufficient information to the external management server 9 based on his or her own judgment.

If a click operation of the transmission button 552 is detected, the client-side determining unit 330 shifts to processing in S230 and, if the click operation of the cancel button 554 is detected, shifts to processing in S245.

In step 230 (S230), the client-side determining unit 330, based on the selection operation by a user on the transmission permission screen 550, identifies the type of the transfer information selected by the user, and notifies the management server 2 of the type of the identified transfer information.

In step 235 (S235), when the transmission unit 334 receives the transfer information from the management server 2, the transmission unit 334 transmits the received transfer information to the external management server 9.

In step 240 (S240), when the transmission of the transfer information is completed by the transmitting unit 334, the result notifying unit 336 notifies the management server 2 of the success or failure.

In step 245 (S245), the inquiring unit 332 monitors the operating state of the browser management software 320. And if the browser management software 320 is stopped, the inquiring unit 332 finishes the transfer processing (S20). If the browser management software 320 is activated, returns to the processing in S205.

Figure 7:
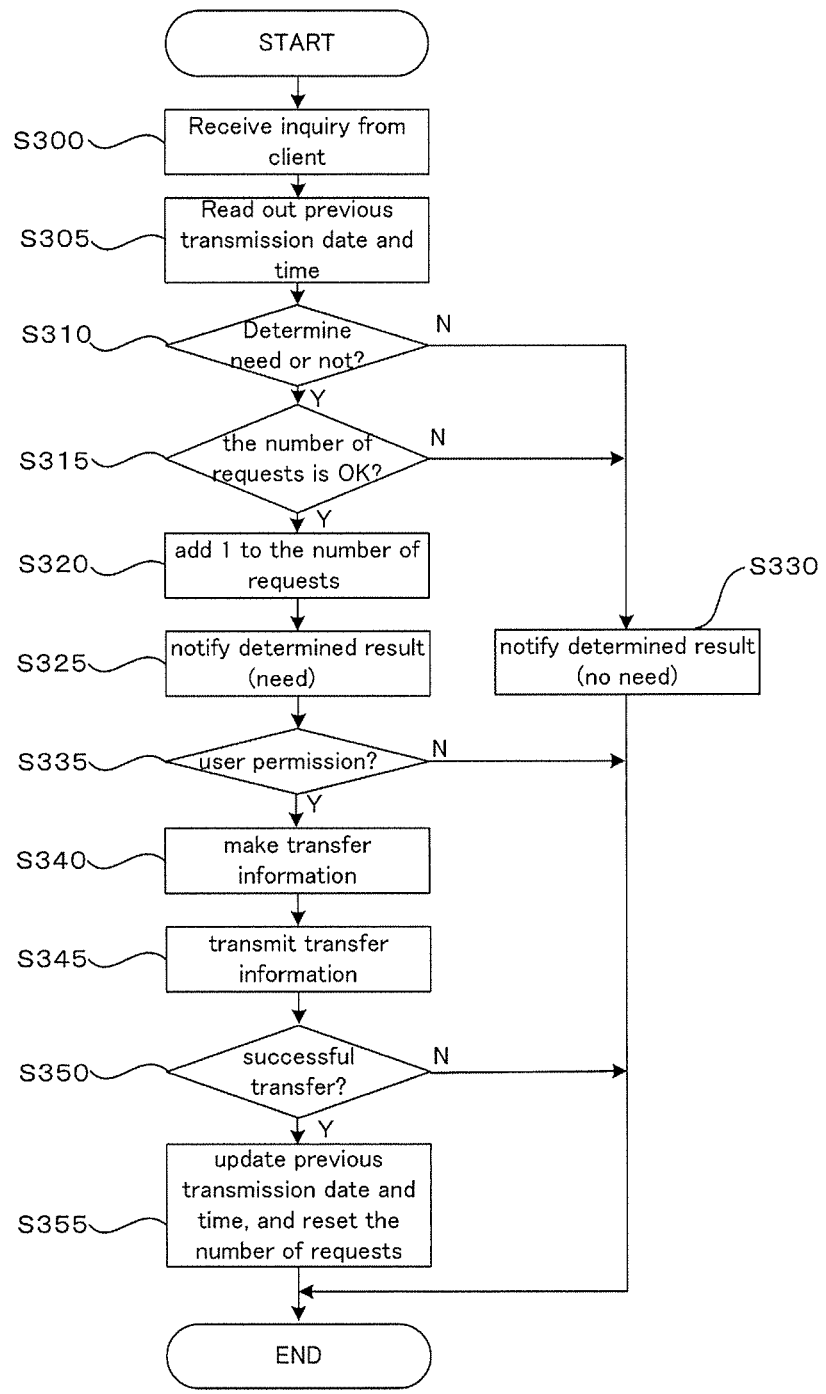
FIG. 7 is an explanatory flowchart of management server processing (S30) by the management server 2.

FIG. 7 is an explanatory flowchart of management server processing (S30) by the management server 2. The management server processing (S30) illustrated in the flowchart is separately performed, every time there is an inquiry from the client terminals 3. And if there are a plurality of inquires at the same time, a plurality of the management server processing (S30) may be performed in a parallel way.

As shown in FIG. 7, in step 300 (S300), the inquiry receiving unit 222 receives an inquiry form the client terminal 3.

In step 305 (S305), the server-side determining unit 224 reads out the previous transmission date and time from the transfer result DB262 when the inquiry receiving unit 222 receives the inquiry.

In step 310 (S310), the server-side determining unit 224 calculates the elapsed date and time, based on the previous transmission date and time read out from the transfer result DB262 and the current date and time. Then, the server-side determining unit 224 permits the information transfer if the elapsed date and time which are calculated are greater than or equal to the predetermined basic date and time. The server-side determining unit 224 prohibits the information transfer if the elapsed date and time which are calculated are less than the predetermined basic date and time.

In step 315 (S315), the server-side determining unit 224 whether or not the number of the client terminals 3 of which the management server 2 requests currently the information transfer (the number of requests) is more than the predetermined upper limit value. If the number of requests is more than the upper limit value, shifts to processing in S330, and if the number of requests is less than or equal to the upper limit value, shifts to processing in S320.

In step 320 (S320), the server-side determining unit 224 adds 1 to the number of requests.

In step 325 (S325), the server-side determining unit 224 notifies the client terminal 3 of the permission of the information transfer.

In step 330 (S330), the server-side determining unit 224 notifies of the prohibition of the information transfer, if the elapsed date and time is less than the basic date and time or if the number of requests is more than the upper limit value.

In step 335 (S335), the server-side program 22 receives the selection result of a user from the client terminal 3. If the user prohibits the information transfer (the cancel button 554 is clicked), the server-side program 22 finishes the management server processing (S30). If the user permits the information transfer (the transmission button 552 is clicked), the server-side program 22 shifts to processing in S340.

In step 340 (S340), the difference extracting unit 226, in accordance with the selection result of a user received from the client terminal 3 ("product name", "product version number", and "ID per product" illustrated in FIG. 9), selects from the management information DB260 the information to be transferred, and extracts the difference information of the selected information.

In step 345 (S345), the difference extracting unit 226 transmits the extracted difference information to the client terminal 3. When the difference extracting unit 226 transmits the difference information (transfer information) to the client terminal 3, the difference extracting unit 226 registers the transfer request as the unfinished transfer processing in the transfer result DB262.

In step 350 (S350), if the result receiving unit 228 receives the success of the information transfer from the client terminal, shifts to processing in 355, and if the result receiving unit 228 receives the failure of the information transfer, finishes the management server processing (S30).

In step 355 (S355), when the result receiving unit 228 receives the success of the information transfer from the client terminal 3, the result receiving unit 228 updates the previous transmission date and time to the current date and time in the transfer result DB262, and resets the number of requests to 0.

The management information collecting unit 220, for example, while the information transfer is not requested, collects automatically the information about the scanner 40 connected to the internal network 6.

As described above, according to the information management system 10, based on the result determined by the management server 2 and the result determined by the client terminal 3, it is possible to transmit some of the information stored in the management server 2 to the external management server 9. Accordingly, without reducing the security level of the management server 2, it is possible to provide the information managed by the management server 2 to the external destination (the external management server 9). In other words, without settings of the proxy server 64 in the management server 2, keeping the state in which the management server 2 cannot be connected to the external network 8, it is possible for the client terminal 3 in which the browser management software 320 is activated to transmit the information to be managed on behalf of the management server 2. Thus, the management server which stores the information resource is invisible from the outside, and it leads to prevent invalid access from the outside to the management server.

Further, the client terminal which transmits on behalf of the management server is not the fixed terminal, and is randomly selected, based on the timing of a user operation, from the plurality of the client terminal 3 in which the browser management software 320 is installed. Therefore, it is difficult to identify the transmission source of the transfer information from the outside.

[Variant 1]

Next, a description will be given of a variant of the embodiment described above.

Figure 10:
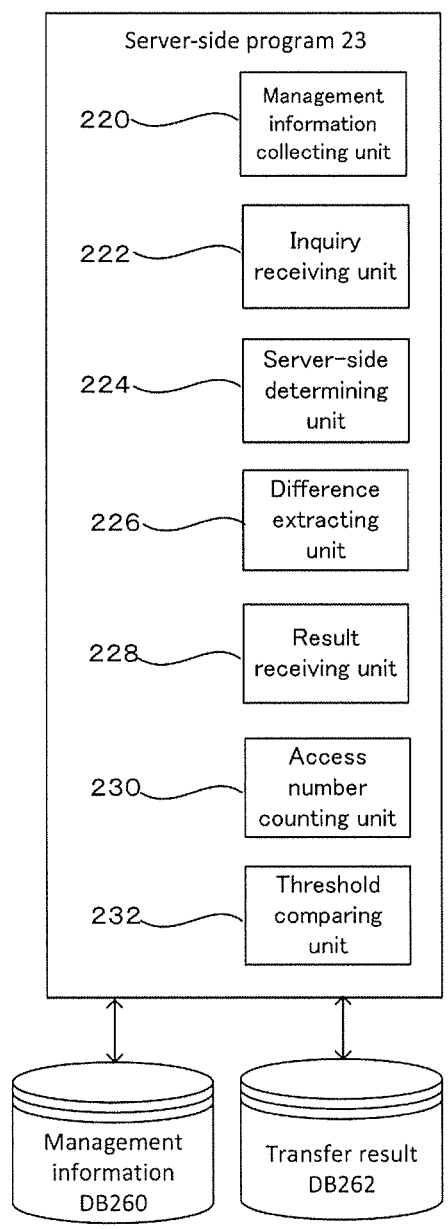
FIG. 10 is an explanatory diagram of a functional configuration of a server-side program 23 in variant 1.

FIG. 10 is an explanatory diagram of a functional configuration of a server-side program 23 in variant 1. The same reference numerals are given to components in the figure which are essentially the same as those shown in FIG. 4.

As shown in FIG. 10, a server-side program 23 in variant 1 has a configuration in which an access number counting unit 230 and a threshold comparing unit 232 are added to the server-side program 22 in FIG. 4.

In the server-side program 23, the access number counting unit 230 counts the number of accesses from the browser management software (the client terminal) which accesses to the management server 2. For example, the access number counting unit 230 counts the number of accesses per unit time.

The threshold comparing unit 232 determines whether or not the information stored in the management information DB260 meets a predetermined condition. For example, the threshold comparing unit 232 determines whether or not the number of errors of the scanner, the number of scanners to update, or the number of consumables to replace, which is stored in the management information DB232, is less than or equal to the threshold.

In this exemplary embodiment, the server-side determining unit 224 determines whether or not to transfer the information based on the number of accesses counted by the access number counting unit 230 or the result determined by the threshold comparing unit 232.

Figure 11:
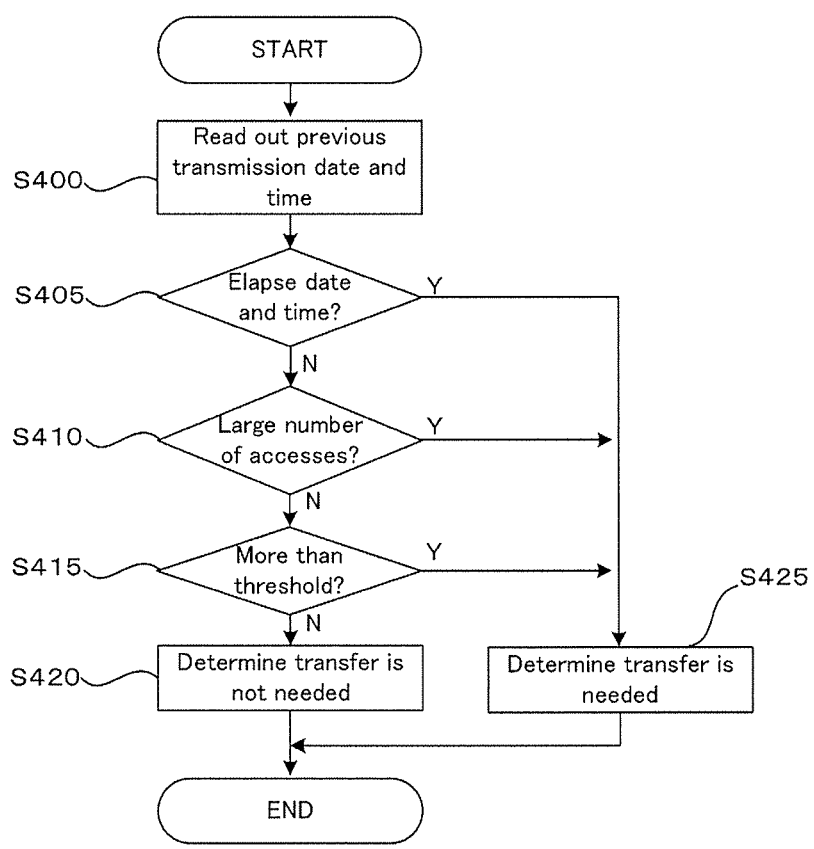
FIG. 11 is an explanatory flowchart of need determining processing (S40) by a server-side determination unit 224 in variant 1.

FIG. 11 is an explanatory flowchart of need determining processing (S40) by the server-side determination unit 224 in variant 1.

As shown in FIG. 11, in step 400 (S400), the server-side determining unit 224 reads out the previous transmission date and time from the transfer result DB262 when the inquiry receiving unit 222 receives the inquiry.

In step 405 (S405), the server-side determining unit 224 calculates the elapsed date and time based on the previous transmission date and time read out from the transfer result DB262 and the current date and time. Then, the server-side determining unit 224 shifts to processing in S425 if the elapsed date and time which are calculated are greater than or equal to the predetermined basic date and time. The server-side determining unit 224 shifts to processing in S410 if the elapsed date and time which are calculated are less than the predetermined basic date and time.

In step 410 (S410), if the number of accesses counted by the access number counting unit 230 is greater than or equal to the predetermined basic value, the server-side determining unit 224 shifts to processing in S425. If the number of the counted accesses is less than the predetermined basic value, shifts to processing in S415. That is, in this exemplary embodiment, if there are a large number of accesses per unit time from the browser management software, the server-side determining unit 224 estimates that an administrator has a high interest in the target to be managed and permits information transfer and encourages support and a suggestion from the external management server 9. Further, If not the number of accesses per unit time but the cumulative number of accesses exceeds a basic value, the server-side determining unit 224 may permit the information transfer.

In 415 (S415), if the threshold comparing unit 232 determines that the information to be managed (the number of scanners, the number of errors of the scanner, the number of scanners to update, or the number of consumables to replace) is more than the threshold, the server-side determining unit 224 shifts to processing in S425. If the threshold comparing unit 232 determines that the information to be managed is less than or equal to threshold, the server-side determining unit 224 shifts to processing in S420. If the number of scanners exceeds the threshold, it is considered that the number of targets to be managed exceeds a certain scale and a new proposal and support by the external management server 9 is needed.

In step 420 (S420), the server-side determining unit 224 prohibits the information transfer.

In step 425 (S425), the server-side determining unit 224 permits the information transfer.

As described above, the management server 2 in variant 1 determines whether or not to permit the information transfer, taking into account the number of accesses from the browser software and the information stored in the management server 2 in addition to the elapsed date and time from the previous transmission date and time. Accordingly, it is possible for the external management server 9 to propose and support timely to the administrator.

[Variant 2]

Although the above embodiment has been described with reference to an aspect in which the client terminal 3 in which the browser management software is installed transmits on behalf of the management server 2 the information stored in the management server 2 to the external management server 9, the invention is not limited to it; for example, the client terminal 3 in which the browser management software is installed may transmit on behalf of the management server 2 the information to confirm an update and a data file for an update. Further, the client terminal 3 in which the browser management software is installed transmits on behalf of the management server 2 the information stored in the management server 2 to the external management server 9, and as a reply information, the client terminal 3 may receive on behalf of the management server 2 the information to confirm an update and a data file for an update.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information management system having a network, the information management system comprising:
   a firewall which separates an internal network from an external network;
   a management server device connected to the internal network and allowed to perform communication only within the network; and
   a client terminal connected to the internal network,
   wherein the management server device includes a processor programmed to:
      store information to be managed in storage; and
      determine whether or not to transmit at least some of the stored information to the external network,
   wherein the client terminal includes a processor programmed to:
      determine whether or not to transfer the information stored by the management server device;
      transmit at least some of the stored information to the external network based on a result determined by the management server device and a result determined by the client terminal, and
   wherein the processor of the management server device is further programmed to:
      collect information about a peripheral device;
      store the collected information about the peripheral device as the information to be managed; and
      determine whether or not to transfer the information based on a period from when the information is previously transmitted by the client terminal.

2. The information management system according to claim 1, wherein the processor of the client terminal is further programmed to:
   run browser software for access to the information to be managed stored by the management server device; and
   determine whether or not to transfer the information if the browser software is activated on the client terminal.

3. The information management system according to claim 2, wherein the processor of the management server device is further programmed to:
   count a number of accesses from the browser software of the client terminal; and
   determine whether or not to transfer the information based on the number of the counted accesses.

4. The information management system according to claim 2,
   wherein the processor of the client terminal is programmed to:
      run the browser software which displays and manages the information about the peripheral device; and
      permit to transfer the information if a user operation is detected on a management screen of the browser software.

5. The information management system according to claim 1, wherein the processor of the management server device is further programmed to:
   permit to transfer the information if the stored information meets a predetermined condition.

6. The information management system according to claim 1, further including a plurality of client terminals, wherein
   the processor of the management server device is programmed to give permission to client terminals of the plurality of client terminals each of which sends the management server device a request of transmitting the stored information in order to transmit the at least some of the stored information until any of the client terminals which are permitted to transmit the at least some of the stored information completes transferring the information successfully.

7. The information management system according to claim 6, wherein
   the processor of the management server device is further programmed to extract only a difference between the stored information and the information previously transferred; and
   the processor of the client terminal is further programmed to transmit the extracted difference information to the outside of the information management system.

8. An information management system having a network, comprising:
   a firewall which separates an internal network from an external network;
   a management server device connected to the internal network and allowed to perform communication only within the network; and
   a client terminal connected to the internal network,
   wherein a processor of the management server device is programmed to store information to be managed in a storage,
   wherein a processor of the client terminal is programmed to:
      run software for access to the management server device;
      transmit some of the information stored by the management server device to the external network if the software is activated, and
   wherein the processor of the management server device is further programmed to:
      collect information about a peripheral device;
      store the collected information about the peripheral device as the information to be managed; and
      determine whether or not to transfer the information based on a period from when the information is previously transmitted by the client terminal.

9. An information providing method for an information management system having a network, the information management system including a firewall which separates an internal network from an external network, a management server device connected to the internal network and allowed to perform communication only within the network, and a client terminal connected to the internal network, the method comprising:
   determining, by the management server device, whether or not to transmit at least some of stored information to an outside of the network;
   determining, by the client terminal, whether or not to transfer the information stored by the management server device;
   transmitting, by the client terminal, at least some of the information stored by the management server device to the external network based on a result determined by the client terminal and a result determined by the management server device;
   collecting, by the management server device, information about a peripheral device;
   storing, by the management server device, the collected information about the peripheral device as the information to be managed; and
   determining, by the management server device, whether or not to transfer the information based on a period from when the information is previously transmitted by the client terminal.

* * * * *